(12) United States Patent
Stults et al.

(10) Patent No.: US 11,624,604 B2
(45) Date of Patent: Apr. 11, 2023

(54) CONCENTRIC PROBE

(71) Applicant: Bell Textron Inc., Fort Worth, TX (US)

(72) Inventors: Brennan Loyd Stults, Keller, TX (US); Nicholas Anthony Stahl, Indianapolis, IN (US)

(73) Assignee: Textron Innovations Inc., Providence, RI (US)

( * ) Notice: Subject to any disclaimer, the term of this patent is extended or adjusted under 35 U.S.C. 154(b) by 548 days.

(21) Appl. No.: 16/811,088

(22) Filed: Mar. 6, 2020

(65) Prior Publication Data
US 2021/0278192 A1 Sep. 9, 2021

(51) Int. Cl.
*G01B 5/20* (2006.01)
*F01D 21/00* (2006.01)

(52) U.S. Cl.
CPC ............ *G01B 5/201* (2013.01); *F01D 21/00* (2013.01)

(58) Field of Classification Search
CPC ......... G01B 5/201; G01B 21/32; F01D 17/08; G01P 5/165; F05D 2250/311; F05D 2260/83; F02C 7/04
See application file for complete search history.

(56) References Cited

U.S. PATENT DOCUMENTS

| | | | |
|---|---|---|---|
| 6,595,062 B1 * | 7/2003 | Luke | G01L 19/0092 73/714 |
| 8,011,251 B1 * | 9/2011 | Snider | G01P 5/165 73/714 |
| 9,664,116 B2 * | 5/2017 | Hockaday | G01K 13/02 |
| 10,598,041 B2 * | 3/2020 | Rice | F01D 17/08 |
| 10,684,183 B2 * | 6/2020 | Burgan | G01M 15/02 |
| 2010/0158074 A1 * | 6/2010 | Fortier | G01L 19/0092 374/208 |
| 2011/0232379 A1 * | 9/2011 | Snider | F01D 17/08 73/272 R |
| 2012/0198675 A1 * | 8/2012 | Fortier | G01L 15/00 29/525.01 |
| 2012/0324988 A1 * | 12/2012 | Hockaday | G01K 13/02 73/112.01 |
| 2015/0000303 A1 * | 1/2015 | Hockaday | G01K 13/02 290/52 |
| 2021/0278192 A1 * | 9/2021 | Stults | G01P 5/165 |
| 2022/0412841 A1 * | 12/2022 | O'Leary | G01M 15/02 |
| 2022/0412842 A1 * | 12/2022 | O'Leary | F01D 25/285 |

OTHER PUBLICATIONS

Arend, David J., et al.; "An Experimental Evaluation of the Performance of Two Combination Pitot Pressure Probes"; Prepared for the 47th Aerospace Sciences Meeting sponsored by the American Institute of Aeronautics and Astronautics; Orlando, Florida; Jan. 5-8, 2009; 24 pages.

* cited by examiner

Primary Examiner — Yaritza Guadalupe-McCall
(74) Attorney, Agent, or Firm — Shackelford, Bowen, McKinley & Norton, LLP (57) ABSTRACT

An example of a concentric probe includes an outer shroud having a bore that extends through the outer shroud, an inner shroud located within the outer shroud and having a bore that extends through the inner shroud, the inner shroud joined to the outer shroud via brazing, an annulus defined by a space between the inner shroud and a wall of the bore of the outer shroud, a plenum defined by a space between the inner shroud and the wall of the bore of the outer shroud, the plenum being in fluid communication with the annulus, and a transducer disposed within inner shroud.

14 Claims, 7 Drawing Sheets

CONCENTRIC PROBE

TECHNICAL FIELD

The present disclosure relates generally to probes for measuring inlet distortion of a turbine and more particularly, but not by way of limitation, to a concentric pitot probe design.

BACKGROUND

This section provides background information to facilitate a better understanding of the various aspects of the disclosure. It should be understood that the statements in this section of this document are to be read in this light, and not as admissions of prior art.

Gas turbine propulsion systems have been used in aircraft for many years. Gas turbines include a gas compressor, a combustor, and a turbine. Gas turbines generate thrust by compressing air that is drawn in through an inlet. The compressed air is mixed with fuel and combusted. The combusted gases generate thrust and also drive the gas compressor.

Ideally, air pressure across the inlet of the gas compressor should be uniform during operation of the gas turbine. In practice, air that flows into the inlet can be disturbed or altered by many things, such as the shape of the inlet, the shape of the aircraft upstream of the inlet, wind conditions, and the like. Disturbances of the airflow into to the inlet can result in non-uniform pressure distribution across the inlet/gas compressor. The variance of pressure across the inlet is referred to as inlet distortion. Small amounts of inlet distortion are manageable. If the inlet distortion becomes too great, the compressor can become imbalanced to the point of failure. To prevent such failures, airflow through gas turbines is tested for inlet distortion.

One method of testing for inlet distortion involves the use of pitot probes. Inlet distortion is measured by positioning pitot probes at a variety of reference points in the inlet of the gas turbine. For example, a plurality of pitot probes are affixed to radially-aligned rakes that are positioned in the airflow path of inlet. Each pitot probe measures the air pressure of the inlet. By comparing the pressures of each pitot probe, inlet distortion can be determined.

One consideration for testing inlet distortion is air speed. Inlet distortion is measured over a variety of airspeeds as the gas turbine will be operated at a variety of airspeeds. To obtain accurate pressure readings throughout the range of desired airspeeds, it is often necessary to utilize two different probe types: a steady-state sensor and a high response sensor (e.g., a high-frequency pressure transducer). For the accuracy of the test, both sensors need to be placed as close to one another as possible. One approach is to use a double-barreled probe with each of the two sensors placed adjacent to one another. Another approach is to use a concentric probe with the two sensors arranged coaxially. The concentric-style design is preferable as each sensor measures pressure at the same location within the inlet of the turbine. In contrast to the concentric probe, the double-barreled probe measures pressure at slightly different locations within the inlet. The slight difference in the location of pressure measurement is significant enough to create offsets in the data collected. The instant disclosure is directed to concentric-style probes, though those having skill in the art will recognize that some aspects of the disclosure will apply to other probe types as well.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a concentric probe includes an outer shroud having a bore that extends through the outer shroud, an inner shroud located within the outer shroud and having a bore that extends through the inner shroud, the inner shroud joined to the outer shroud via brazing, an annulus defined by a space between the inner shroud and a wall of the bore of the outer shroud, a plenum defined by a space between the inner shroud and the wall of the bore of the outer shroud, the plenum being in fluid communication with the annulus, and a transducer disposed within inner shroud.

An example of a rake for measuring inlet distortion of a turbine inlet includes a base having a removable cover and an opening formed through the base. The opening formed through the base is blocked by the removable cover when the removable cover is attached to the base. The rake also includes a body secured to the base. The body includes a removable side wall and a concentric probe secured to the body.

An example of an inlet distortion measurement system includes a frame comprising a slot and a rake extending through the slot of the frame. The rake includes a base having a removable cover and an opening formed through the base. The opening formed through the base is blocked by the removable cover when the removable cover is attached to the base. The rake includes a body secured to the base. The body includes a removable side wall and a concentric probe secured to the body.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
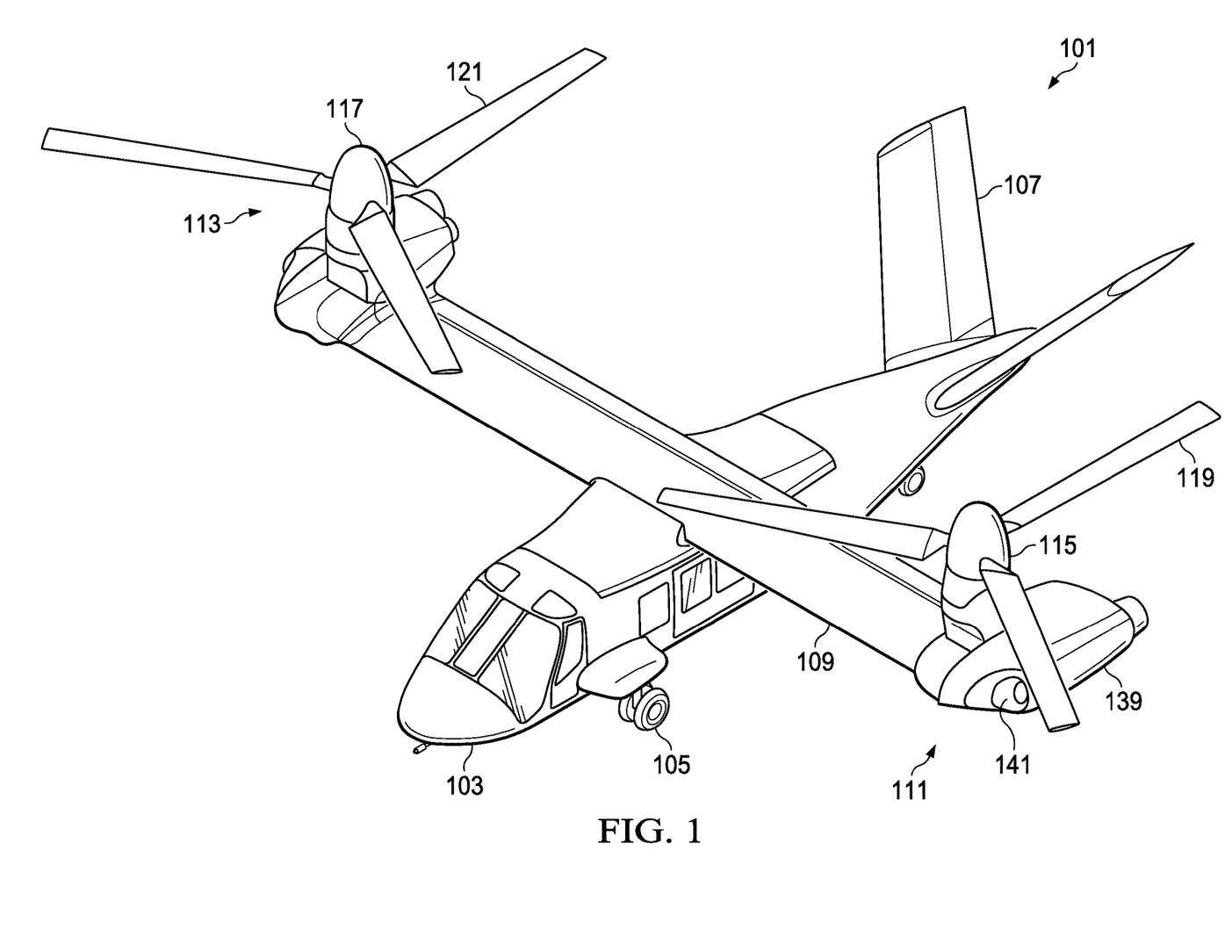
FIG. 1 is a perspective view of a tiltrotor aircraft in helicopter mode, according to aspects of the disclosure.
Figure 2:
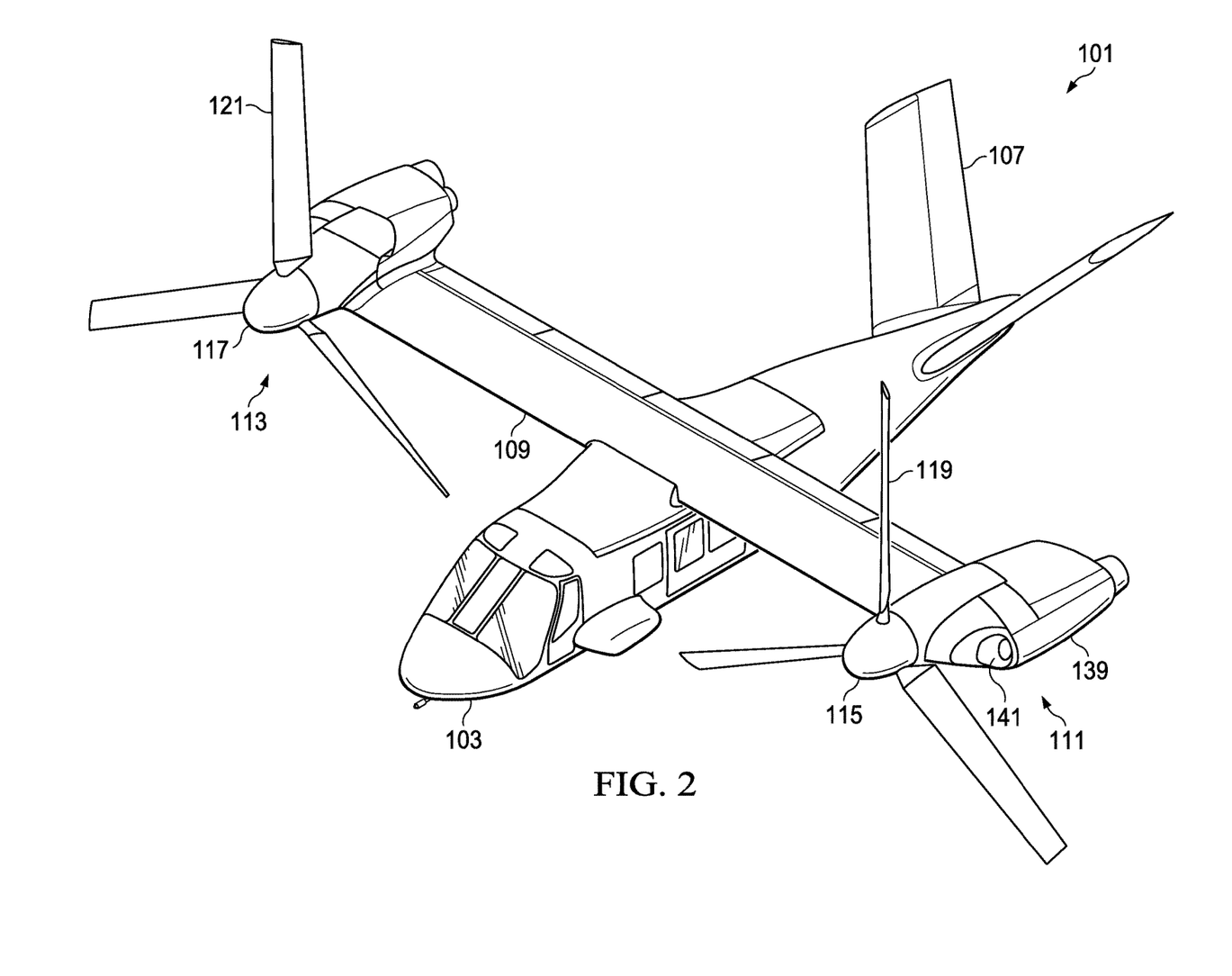
FIG. 2 is a perspective view of a tiltrotor aircraft in airplane mode, according to aspects of the disclosure.

FIGS. 1 and 2 illustrate a tiltrotor aircraft 101, according to aspects of the disclosure. Tiltrotor aircraft 101 includes a fuselage 103, landing gear 105, a tail member 107, a wing 109, a drive system 111, and a drive system 113. Each drive system 111, 113 includes a fixed engine 139 and a proprotor 115, 117, respectively. Each engine 139 includes an inlet 141. Each proprotor 115, 117 has a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101.

Figure 3:
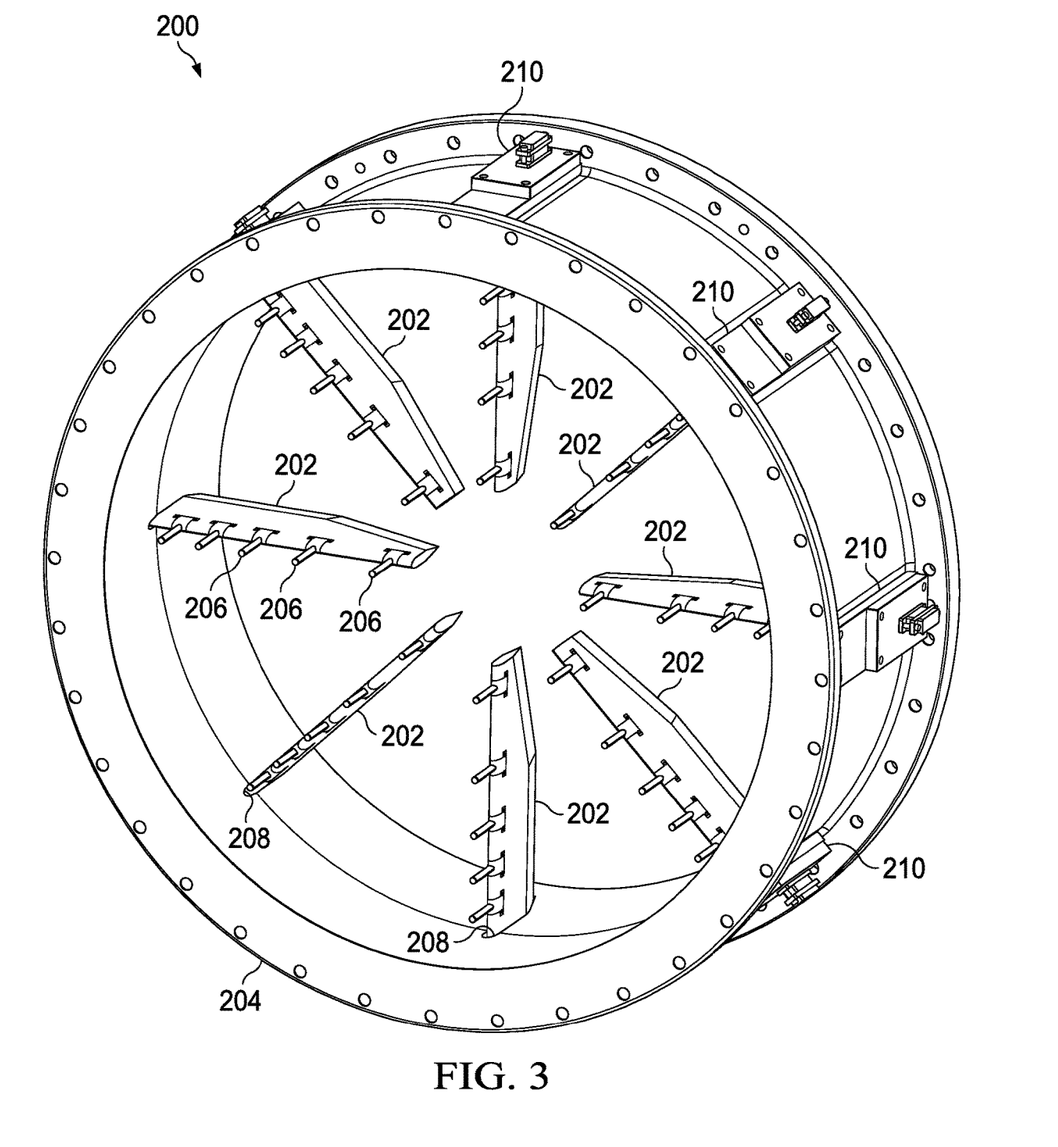
FIG. 3 is a perspective view of an inlet distortion measurement system, according to aspects of the disclosure.

FIG. 3 is a perspective view of an inlet distortion measurement system 200, according to aspects of the disclosure. System 200 is configured to be placed inline with inlet 141 to measure the pressure of a flow field at inlet 141. Inlet 141 is used by way of example. Those having skill in the art will recognize that system 200 may be adapted for use with a wide variety of engines. In some aspects, system 200 may be placed in front of inlet 141, and in other aspects system 200 may be placed within or partially within inlet 141. System 200 includes a plurality of rakes 202 that are secured to a frame 204. Frame 204 comprises a shape and size to complement the shape and size of inlet 141. As illustrated in FIG. 3, frame 204 comprises a circular shape to complement the circular shape of inlet 141. In other aspects, frame 204 can comprise a various other shapes as desired, such as oval, rectangular, etc. to suit an inlet of a variety of engines. Each rake 202 extends radially inwards from frame 204 and includes a plurality of probes 206 distributed along length of rake 202. Each probe 206 is oriented so that a tip of each probe 206 faces the airstream flowing into inlet 141. In the aspect illustrated in FIG. 3, system 200 includes eight rakes 202, with each rake 202 including five probes 206. In other aspects, system 200 may include more or fewer rakes 202, and each rake 202 may include more or fewer probes 206. For example, as the diameter of the turbine inlet increases, inclusion of additional rakes 202/probes 206 may be desirable for better coverage of the inlet. Similarly, as inlet diameter decreases, removal of rakes 202/probes 206 may be appropriate.

In the aspect illustrated in FIG. 3, frame 204 includes a plurality of slots 208 through which the plurality of rakes 202 may be inserted and removed. Each rake 202 includes a base 210 that is configured to be secured to frame 204 to secure each rake 202 to frame 204 (e.g., by fasteners and/or adhesives).

Figure 4:
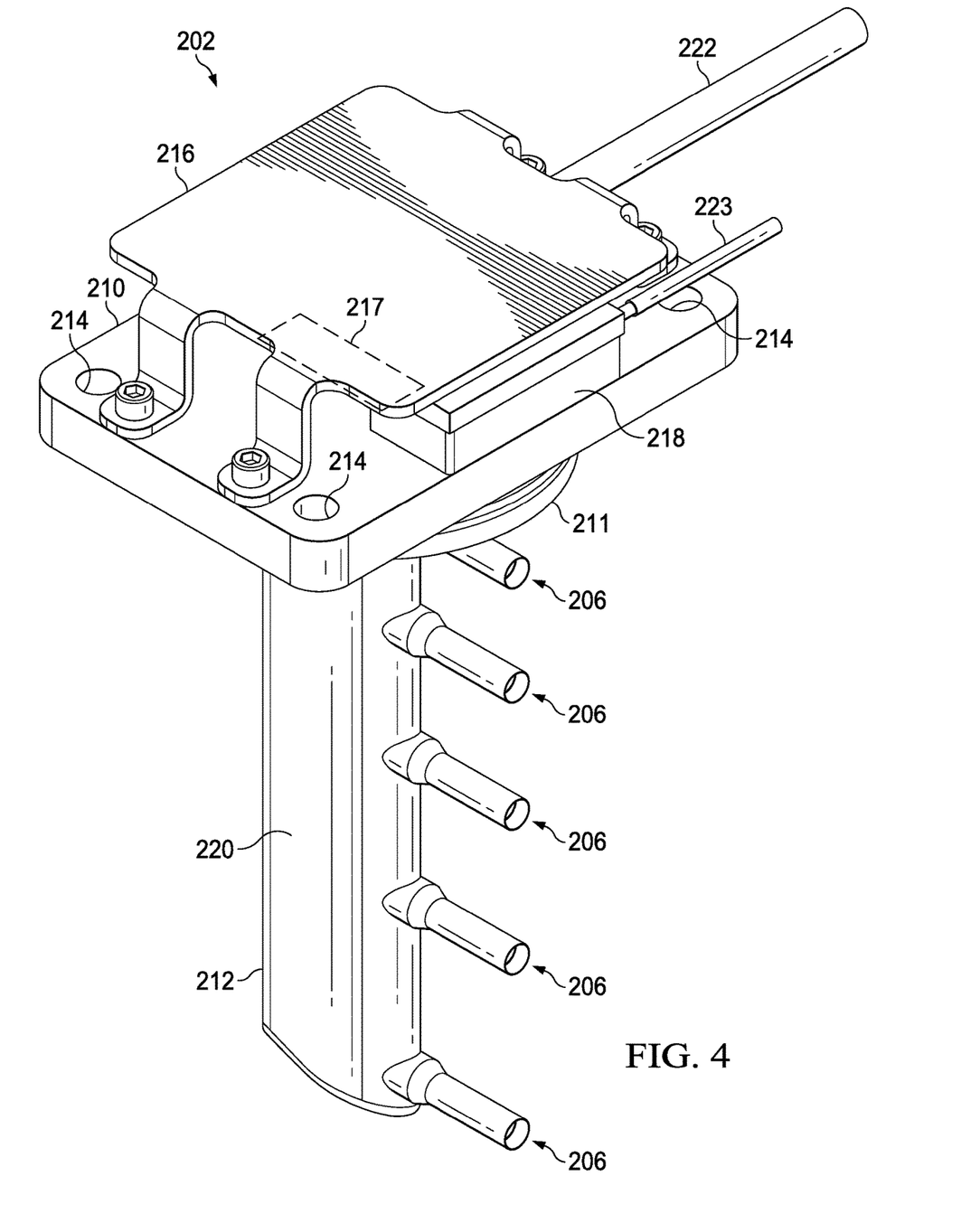
FIG. 4 is a perspective view of a rake of an inlet distortion measurement system, according to aspects of the disclosure.

FIG. 4 is a perspective view of a single rake 202 of system 200, according to aspects of the disclosure. Rake 202 includes a body 212 that is attached to base 210. Base 210 is secured to an outside of frame 204 (see FIG. 3) and, in some aspects, a seal 211 may be inserted in between frame 204 and base 210 to provide an air tight seal therebetween to prevent air from flowing through slots 208. Seal 211 may be a gasket (e.g., a rubber or plastic gasket), a sealant (e.g., a silicone sealant or the like), tape, etc. Body 212 is configured with an airfoil shape so that rake 202 only minimally affects the flow of air entering inlet 141.

Base 210 includes bores 214, a cover 216, and a sensor module 218. Bores 214 receive fasteners (e.g., bolts) to secure rake 202 to frame 204. Cover 216 protects sensor module 218 and also secures a side wall 220 of body 212 in place. The operation of side wall 220 will be discussed in more detail below (e.g., see FIGS. 5 and 6). Sensor module 218 is in communication with each probe 206 of rake 202 to measure air pressure at the tip of each probe 206. Sensor module 218 may include, for example, a manifold that pneumatically combines the reference side of each high response sensor so that all have a common reference. Leads 222, 223 transmit pressure data to a remote location (e.g., a computer) that collects the pressure data measured by probes 206. Lead 222 is fluidly and electrically coupled to the plurality of probes 206 to measure pressure associated with a steady-state and high-frequency sensor of the plurality of probes 206 and lead 223 is fluidly coupled to the plurality of probes 206 to measure reference pressure data associated with a high-frequency pressure transducer of the plurality of probes 206.

Figure 5:
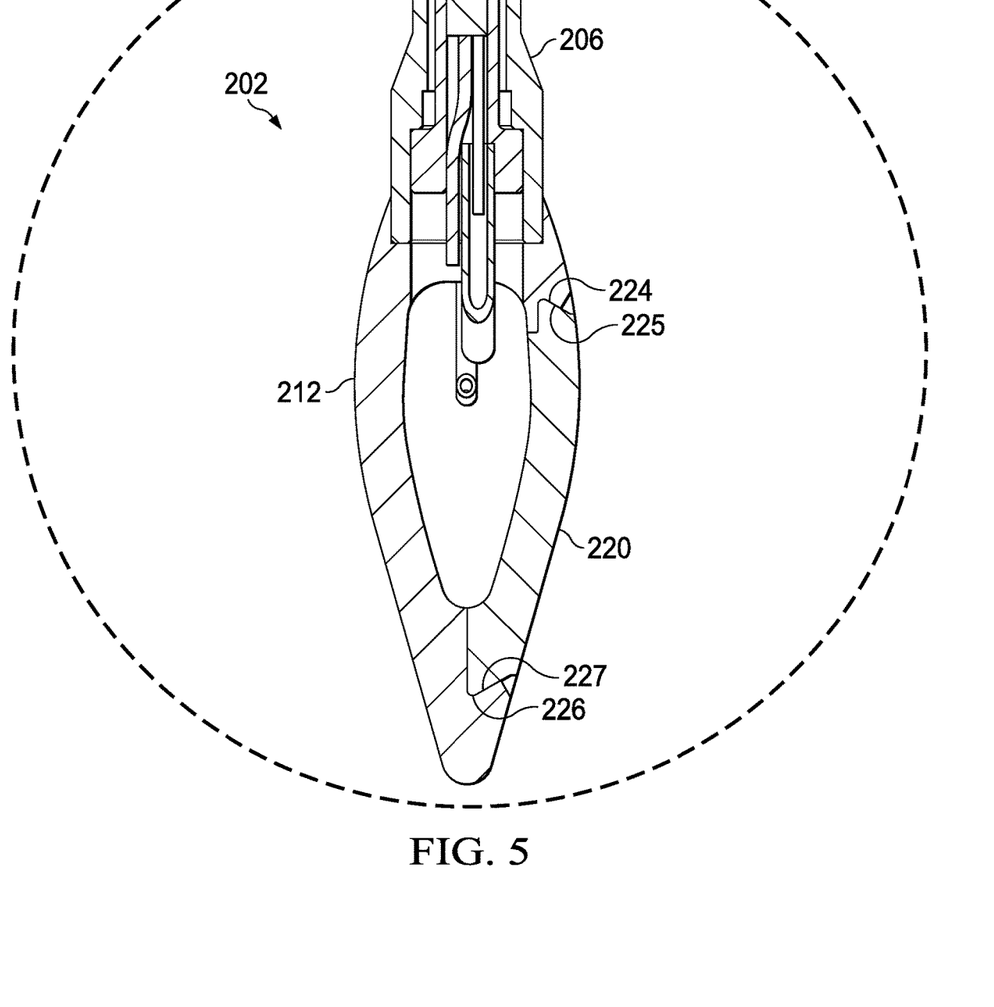
FIG. 5 is a sectioned top view of the rake of FIG. 4, according to aspects of the disclosure.

FIG. 5 is a sectioned top view of rake 202 of FIG. 4, according to aspects of the disclosure. FIG. 5 illustrates how side wall 220 is secured to body 212. Body 212 includes tracks 224, 226 that engage ridges 225, 227 of side wall 220. With this arrangement, side wall 220 is permitted to slide within tracks 224, 226 for removal. The sliding track arrangement creates smooth exterior surface to minimize the creation of drag as air flows around body 212. This smooth exterior is aided by an adhesive sealant described below. In some aspects, side wall 220 may be secured to body 212 by one or more fasteners instead of the sliding track arrangement discussed above.

Removing side wall 220 allows for an interior chamber of body 212 to be accessed to perform maintenance on the plurality of probes 206. For example, in the event that one probe 206 of the plurality of probes 206 becomes damaged or otherwise needs to be repaired or replaced, side wall 220 may be removed from rake 202 and the damaged probe 206 can be individually replaced. To replace one or more of the plurality of probes 206, side wall 220 is removed by first removing cover 216. In some aspects, a retainer clip or fastener secures side wall 220 to base 210. If present, the retainer or fastener is undone/removed. Side wall 220 may then be slide up through an opening 217 in base 210. With side wall 220 removed, any tubes/wires coupled to probe 206 (e.g., see FIGS. 6 and 7) can be decoupled from the probe 206 to be replaced. The probe 206 to be replaced can then be removed from body 212. A new probe 206 can then be installed by inserting the new probe 206 into body 212 and recoupling the necessary tubes/wires. In contrast to the instant disclosure, conventional rakes are sealed designs that do not permit any of the probes to be replaced. In the event that a single probe of a conventional rake stops working, the entire rake must be replaced. As it is not uncommon for a single rake to cost tens of thousands of dollars, the ability to repair a rake by replacing an individual probe can provide immense cost savings.

In some aspects, a sealant may be used to prevent air from flowing through the spaces between tracks 224, 226 and ridges 225, 227. Suitable sealants include silicone sealants and the like. It will be appreciated by those having skill in the art that a variety of arrangements utilizing tracks, rail, slots, grooves, and the like can be used to slidably secure side wall 220 to body 212.

Figure 6:
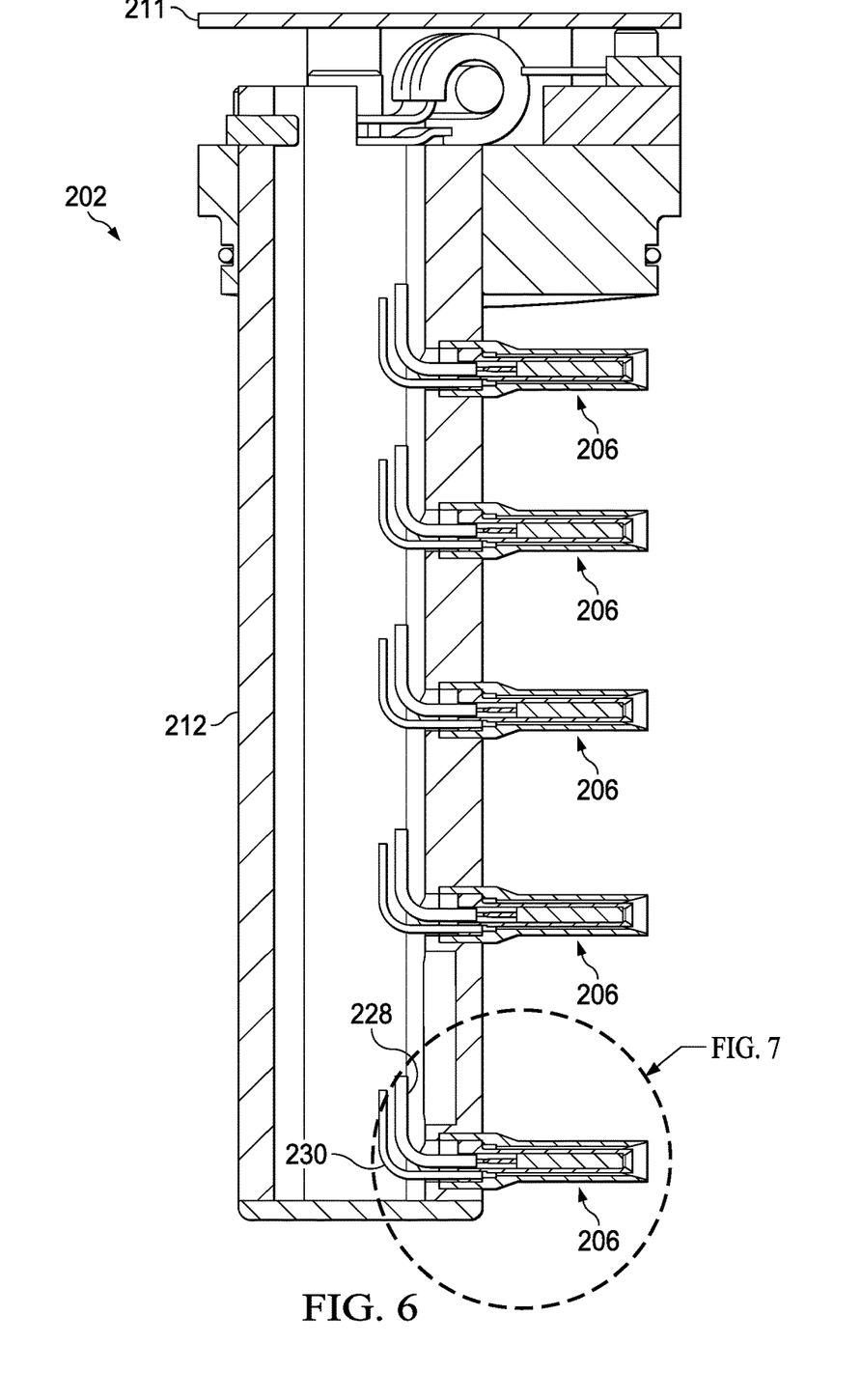
FIG. 6 is a side view of the rake of FIG. 4, according to aspects of the disclosure.

FIG. 6 is a side view of rake 202 of FIG. 4, according to aspects of the disclosure. In FIG. 6, side wall 220 has been removed and the inside of body 212 can be seen. Each probe 206 includes two pressure outputs. A first output 228 provides pressure readings from a high-frequency pressure transducer and a second output 230 provides pressure readings from a steady-state sensor. First output 228 may be an electrical lead that couples with lead 223 and second output 230 may be a pressure hose that couples with lead 222. Probe 206 is discussed in more detail below.

Figure 7:
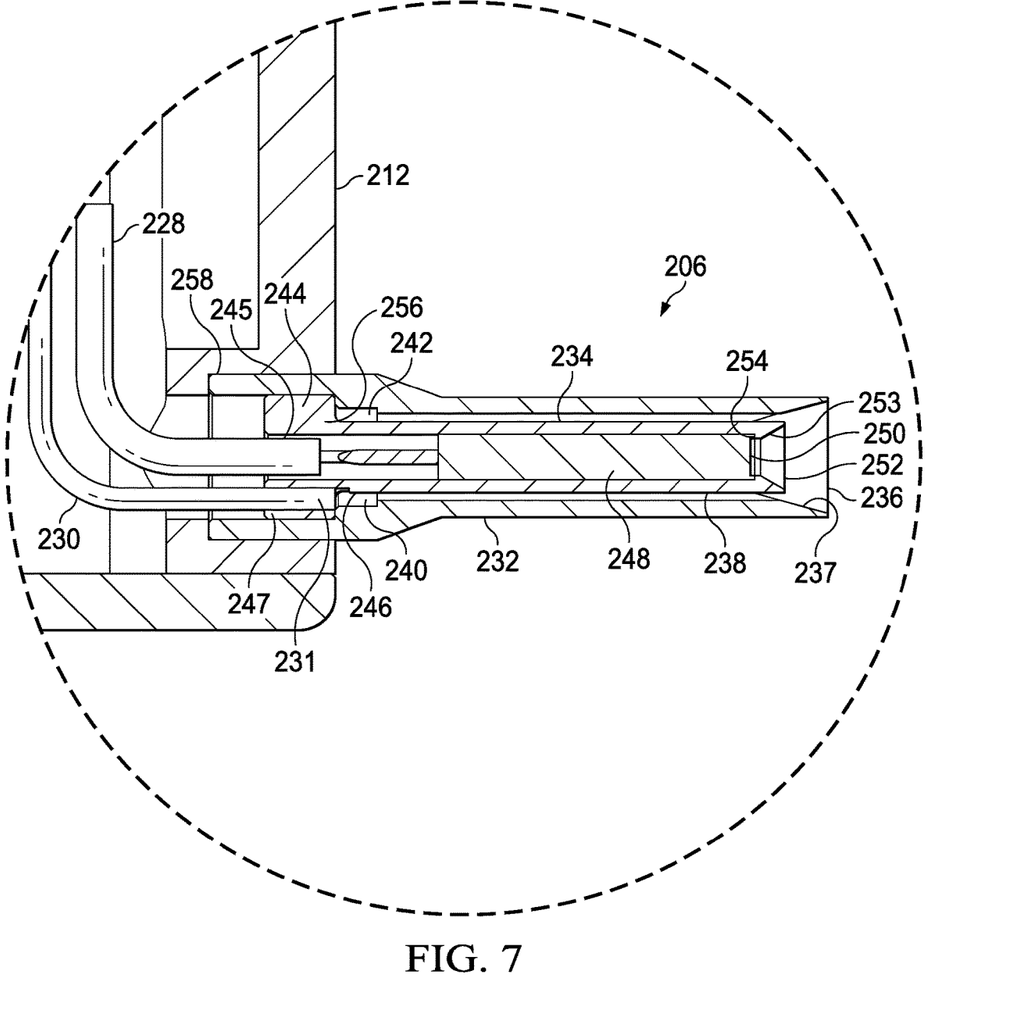
FIG. 7 is a sectioned side view of a concentric probe, according to aspects of the disclosure.

FIG. 7 is a sectioned side view of a single probe 206, according to aspects of the disclosure. Each probe 206 of the plurality of probes 206 are similar. Only a single probe 206 is discussed with the understanding that the discussion thereof applies to all probes 206. Probe 206 includes an outer shroud 232 that houses an inner shroud 234. In contrast to prior probe designs utilizing inner shrouds formed from multiple pieces, inner shroud 234 is a single-piece design. The single-piece design reduces cost and complexity compared to multi-piece designs. In some aspects, outer shroud 232 includes a plurality of ridges that extend along a length of an inner bore of outer shroud 232. These ridges provide support for inner shroud 234 while at the same time allowing for the passage of air.

Outer shroud 232 includes an opening 236 that that is oriented to be generally normal (e.g., within +/−15° of normal) to the flow of air that enters inlet 141. Opening 236 allows probe 206 to obtain pressure readings of the flow field of inlet 141. Opening 236 includes a beveled edge 237 that helps straighten the flow of air into outer shroud 232. An annulus 238 separates inner shroud 234 from outer shroud 232 and communicates air pressure from opening 236 to a plenum 240. Plenum 240 is a chamber or pocket that is fluidly coupled to annulus 238 and communicates air pressure to sensor module 218 via second output 230 for the measurement of steady-state pressures. Plenum 240 is the space formed between an inner wall 242 of outer shroud 232, a head 244 of inner shroud 234, and an outer wall 246 of inner shroud 234. Head 244 includes a bore 245 and a bore 247 through which first and second outputs 228, 230, respectively, pass.

In contrast to previous concentric probe designs that included sharp right-angle bends, plenum 240 provides a straighter, less-angled flow path compared to conventional probe designs. An inlet 231 of second output 230 passes through bore 247 of head 244. As plenum 240 has a shape similar to a donut, bore 247 is always aligned with plenum 240, regardless of the radial orientation of head 244. In particular, FIG. 7 illustrates that a central axis of inlet 231 of second output 230 is parallel with a central axis of plenum 240 to allow an essentially straight-through design without any bends.

Inner shroud 234 houses a high-frequency pressure transducer 248. Transducer 248 is a pressure sensor that measures air pressure present at a sensor tip 250. Sensor tip 250 includes a diaphragm that is displaced by the pressure of the air adjacent the diaphragm. The displacement of the diaphragm is converted into an electrical signal that is interpreted by sensor module 218 as air pressure. The operation of transducers is known in the art and will not be discussed in more detail. In some aspects, sensor tip 250 of transducer 248 includes an integrated screen. The integrated screen protects transducer 248 from debris and helps further straighten air flow into transducer 248.

Inner shroud 234 includes an opening 252 that includes a lip 254 and a beveled edge 253. Lip 254 extends radially into the bore of inner shroud 234 and acts as a stop for sensor tip 250 of transducer 248 to help accurately position transducer 248 within inner shroud 234. In some aspects, the position of sensor tip 250 relative to opening 236 must be precise to enable transducer 248 to provide accurate pressure readings. Lip 254 allows for transducer 248 to be easily and accurately positioned, simplifying the assembly process. Lip 254 also prevents transducer 254 from falling out of probe 206 and into the flowpath. Beveled edge 253 is similar to beveled edge 237 and helps straighten the flow of air into inner shroud 234.

To assemble probe 206, inner shroud 234 is inserted into outer shroud 232 until head 244 of inner shroud 234 abuts edge 256 of the bore of outer shroud 232. Next, second output 230 is inserted into inner shroud 234 until second output 230 abuts an opening of plenum 240. Second output 230, outer shroud 232, and inner shroud 234 are then brazed together as a subassembly. This subassembly is installed into body 212 and brazed in a second braze cycle. Next, transducer 248 is inserted into inner shroud 234 so that sensor tip 250 abuts lip 254. First output 228, which is pre-attached to sensor 248, and second output 230 may then be routed out of body 212 through base 210. These steps are carried out for each probe 206 that is installed into rake 202.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rake for measuring inlet distortion of a turbine inlet, the rake comprising:
    a base comprising a removable cover and an opening formed through the base, wherein the opening is blocked by the removable cover when the removable cover is attached to the base; and a body secured to the base and comprising:
  a removable side wall; and
  a concentric probe secured to the body.

2. The rake of claim 1, comprising a sensor module secured to the base and coupled to the concentric probe.

3. The rake of claim 1, comprising a seal disposed between the body and the base to prevent passage of air through a slot of a frame to which the rake is secured.

4. The rake of claim 1, wherein the removable side wall comprises a ridge that is configured to slide within a track of the body to allow removal of the removable side wall.

5. The rake of claim 1, wherein the concentric probe comprises:
  an outer shroud having a bore that extends through the outer shroud;
  an inner shroud located within the outer shroud and having a bore that extends through the inner shroud, the inner shroud joined to the outer shroud via brazing;
  an annulus defined by a space between the inner shroud and a wall of the bore of the outer shroud;
  a plenum defined by a space between the inner shroud and the wall of the bore of the outer shroud, the plenum being in fluid communication with the annulus; and
  a transducer disposed within inner shroud.

6. The rake of claim 5, wherein the inner shroud is joined to the outer shroud via brazing.

7. The rake of claim 5, wherein the inner shroud comprises a head with a bore formed therethrough, the bore being in fluid communication with the plenum.

8. The rake of claim 7, wherein an axis of the bore of the head is parallel to an axis of the plenum.

9. An inlet distortion measurement system comprising:
  a frame comprising a slot; and
  a rake extending through the slot of the frame, the rake comprising:
    a base comprising a removable cover and an opening formed through the base, wherein the opening is blocked by the removable cover when the removable cover is attached to the base; and
    a body secured to the base and comprising:
      a removable side wall; and
      a concentric probe secured to the body.

10. The inlet distortion measurement system of claim 9, wherein the removable side wall comprises a ridge that is configured to slide within a track of the body to allow removal of the removable side wall.

11. The inlet distortion measurement system of claim 9, wherein the concentric probe comprises:
  an outer shroud having a bore that extends through the outer shroud;
  an inner shroud located within the outer shroud and having a bore that extends through the inner shroud, the inner shroud joined to the outer shroud via brazing;
  an annulus defined by a space between the inner shroud and a wall of the bore of the outer shroud;
  a plenum defined by a space between the inner shroud and the wall of the bore of the outer shroud, the plenum being in fluid communication with the annulus; and
  a transducer disposed within inner shroud.

12. The inlet distortion measurement system of claim 11, wherein the inner shroud is joined to the outer shroud via brazing.

13. The inlet distortion measurement system of claim 11, wherein the inner shroud comprises a head with a bore formed therethrough, the bore being in fluid communication with the plenum.

14. The inlet distortion measurement system of claim 13, wherein an axis of the bore of the head is parallel to an axis of the plenum.

* * * * *